Patented Mar. 6, 1934

1,949,485

UNITED STATES PATENT OFFICE 1,949,485

CYANAMID SEED DISINFECTANT

Vartkes Migrdichian, Elizabeth, N. J., and John L. Horsfall, Yonkers, N. Y., assignors to American Cyanamid Company, New York, N. Y., a corporation of Maine No Drawing. Application September 5, 1930, Serial No. 480,031

9 Claims. (Cl. 167—38)

This invention relates to seed disinfectants and the process of using same, and concerns, more particularly that class of seed disinfectants which are applied in dust or powder form.

The majority of seeds carry, adhering to the seed coat or just inside of the seed coat, the spores of certain fungi. When the seeds are planted these spores may germinate and the subsequent fungus growth may attack the young seedling plant. This attack may result in a rotting of the roots or the stem, and finally in the death of the plant. In some cases, the growing plant may not even break through the ground before it is killed by the fungus. In any event, such diseases cause a reduction in the stand of various farm products and the like, with consequent loss in production.

Several methods have been devised in the past to disinfect seeds and kill these fungus spores. Certain toxic dust materials have been suggested for use, fumigation with various substances has been tried, and various solutions have been applied to seeds in an effort to reduce the losses due to the various diseases. Substantially all of these methods and substances have not been as successful as might be desired and many are open to serious objections to their use. If the materials attack the seed itself or if they are not correctly applied, the seed may be injured with a reduction in germination. Furthermore, the wet treatment of seed is sometimes inconvenient and requires, in addition, a drying operation which may be costly and otherwise undesirable.

We have discovered that a series of cyanamid salts are excellent for use as disinfectants for combating seed diseases and they are particularly valuable for use as dusting disinfectants. This group of compounds includes various toxic metal salts of cyanamid or substituted cyanamids, among which may be mentioned lead, zinc, mercury, cadmium, bismuth, iron, etc. The substituted cyanamids include those cyanamids containing a substituent hydrocarbon radical such as an aromatic radical or group, e. g. phenyl or the like.

The following formulas are typical of some of the compositions which we have found efficacious, although it is understood that the invention is by no means limited thereto.

Example 1

| | |
|---|---|
| Zinc phenyl cyanamid | 10% |
| Talc | 90% |

Example 2

| | |
|---|---|
| Cadmium phenyl cyanamid | 10% |
| Talc | 90% |

Example 3

| | |
|---|---|
| Mercuric phenyl cyanamid | 10% |
| Talc | 90% |

Example 4

| | |
|---|---|
| Lead cyanamid | 10% |
| Talc | 90% |

In many cases better results are obtained by mixing the cyanamid salt with other seed disinfectants such as those described in the application of Buchanan and Moore, Serial No. 373,942, filed June 26, 1929, in which there is disclosed the use of a series of compounds known as organic dithiophosphates, and particularly the toxic metal salts thereof. The following examples are typical of such mixed disinfectants.

Example 5

| | |
|---|---|
| Mercuric phenyl cyanamid | 10% |
| Lead di-ethyl dithiophosphate | 5% |
| Talc | 85% |

Example 6

| | |
|---|---|
| Zinc phenyl cyanamid | 10% |
| Lead di-ethyl dithiophosphate | 5% |
| Talc | 85% |

Example 7

| | |
|---|---|
| Zinc cyanamid | 10% |
| Lead di-ethyl dithiophosphate | 5% |
| Talc | 85% |

Mixtures of the various cyanamids may also be used. Typical of such combinations are the following:

Example 8

| | |
|---|---|
| Mercuric cyanamid | 10% |
| Carmium phenyl cyanamid | 3% |
| Talc | 87% |

Example 9

| | |
|---|---|
| Lead cyanamid | 10% |
| Mercuric phenyl cyanamid | 5% |
| Talc | 85% |

Other substances may be mixed with the disinfectants to produce combinations having various valuable properties. For instance, fertilizing materials such as ammonium phosphate and the like may be used as part of the mixture. It is also sometimes desirable to add to the disinfectant, materials known as wetting agents which, in these combinations, have the property of assisting the action of the disinfectant on the seeds treated.

The cyanamid dusts may be prepared and applied in any well known manner and are found to be valuable in controlling the various fungus diseases of seeds, root rot, Gibberella, Diplodia, and the like. Furthermore, our disinfectants act to increase germination of the seeds treated with them.

While the cyanamid salts may be used alone, it is usually preferable to mix them with inert fillers or spreading materials such as talc, pumice, bentonite, kieselguhr, fuller's earth, silica, silicates, graphite, chalk, etc. These materials are preferably in a finely divided state, as are the cyanamids, and mixtures of the various ingredients are easily prepared in any well known manner. The proportions of the various ingredients in the finished dust may be varied widely in accordance with the particular effects desired and the conditions under which they are to be used.

Under some circumstances it may be desirable and feasible to apply the present seed disinfectants in the form of solutions or suspensions in water or other liquid, and the present invention does not preclude such use. For instance, in treating seed potatoes, the disinfectant may be made up of, as a suspension, one or more of the disinfecting compositions, or as a solution of such materials as are soluble. The potatoes or the like are treated by immersing them in the suspension or solution and subsequently drying, if desired.

It will be apparent that the invention is susceptible of many changes and variations without departing from the spirit and scope thereof except as defined in the appended claims.

We claim:

1. A seed disinfectant comprising a toxic metal salt of an aromatic hydrocarbon-substituted cyanamid, the toxic metal being selected from a group consisting of lead, zinc, mercury, cadmium, bismuth and iron.

2. A seed disinfectant comprising a toxic metal salt of phenyl cyanamid, the toxic metal being selected from a group consisting of lead, zinc, mercury, cadmium, bismuth and iron.

3. A seed disinfectant comprising a mercury cyanamid salt.

4. A seed disinfectant comprising mercury phenyl cyanamid.

5. A seed disinfectant comprising a mercury cyanamid salt and a toxic metal salt of an organic di-substituted dithiophosphoric acid.

6. A seed disinfectant comprising a mercury salt of phenyl cyanamid and lead di-ethyl dithiophosphate.

7. A seed disinfectant comprising a mercury cyanamid salt and lead di-ethyl dithiophosphate.

8. A seed disinfectant comprising a mercury salt of an aromatic hydrocarbon-substituted cyanamid and lead di-ethyl dithiophosphate.

9. A seed disinfectant comprising a mercury salt of an aromatic hydrocarbon-substituted cyanamid.

VARTKES MIGRDICHIAN.
JOHN L. HORSFALL.